US012735187B2

(12) United States Patent
Guruswamy

(10) Patent No.: US 12,735,187 B2
(45) Date of Patent: Sep. 15, 2026

(54) AERODYNAMIC FRAMEWORK FOR PARACHUTE DEPLOYMENT FROM AERIAL VEHICLE

(71) Applicant: UNITED STATES OF AMERICA AS REPRESENTED BY THE ADMINISTRATOR OF NASA, Washington, DC (US)

(72) Inventor: Guru P. Guruswamy, Sunnyvale, CA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 104 days.

(21) Appl. No.: 18/934,227

(22) Filed: Oct. 31, 2024

(65) Prior Publication Data

US 2026/0116548 A1 Apr. 30, 2026

(51) Int. Cl.
*B64D 17/62* (2006.01)

(52) U.S. Cl.
CPC .................................... *B64D 17/62* (2013.01)

(58) Field of Classification Search
CPC ...................................................... B64D 17/62
USPC ......................................................... 244/139
See application file for complete search history.

(56) References Cited

U.S. PATENT DOCUMENTS 6,808,144 B1 * 10/2004 Nicolai .................. B64U 80/82 244/152
8,794,567 B2 * 8/2014 Adir ........................ B64C 15/14 244/52
9,613,539 B1 * 4/2017 Lindskog ............... H02K 7/183
9,738,383 B2 * 8/2017 Adams ................. B64D 17/025
9,908,638 B1 * 3/2018 Vawter ..................... B64D 1/12
10,004,652 B1 * 6/2018 Groden .................. B64D 17/80
10,059,459 B2 * 8/2018 Clark ..................... G05D 1/105
10,106,264 B1 * 10/2018 Robertson ............. B64D 17/80

(Continued)

FOREIGN PATENT DOCUMENTS

CN 120986672 A * 11/2025 ............ B64U 70/83

OTHER PUBLICATIONS

Guruswamy, G., "Takeoff Simulation of Lift + Cruise Air Taxi by Using Navier-Stokes Equations", AIAA Journal, 4 pages, 2020.

(Continued)

*Primary Examiner* — Christopher P Ellis
(74) *Attorney, Agent, or Firm* — Rhys W. Cheung; Trenton J. Roche

(57) ABSTRACT

A computer-implemented method for determining landing conditions of an aerial vehicle includes receiving an input model representing the aerial vehicle with an internally-stored parachute and pre-determined environmental conditions, initiating a computational fluid dynamics (CFD) simulation for flight of the aerial vehicle in the pre-determined environmental conditions, receiving, from a simulation database, pre-computed aerodynamic data, including aerodynamic quantities for representing deployment of the internally-stored parachute and descent of the aerial vehicle, and coupling one or more trajectory equations with the pre-computed aerodynamic data and structural quantities of the aerial vehicle to simulate descent and landing of the aerial vehicle in the pre-determined environmental conditions via a deployed parachute.

20 Claims, 7 Drawing Sheets

(56) References Cited

U.S. PATENT DOCUMENTS

| | | | | |
|---|---|---|---|---|
| 10,287,023 | B2 * | 5/2019 | Lin | B64D 17/80 |
| 10,435,162 | B2 * | 10/2019 | Robertson | B64D 17/80 |
| 11,186,376 | B2 * | 11/2021 | Fields | B64D 17/02 |
| 11,256,253 | B2 * | 2/2022 | Robertson | B64D 17/80 |
| 11,459,113 | B2 * | 10/2022 | Robertson | B64D 17/80 |
| 11,673,656 | B2 * | 6/2023 | Kim | B64C 25/30<br>701/16 |
| 11,780,595 | B1 * | 10/2023 | Hakki | B64D 17/34<br>244/145 |
| 11,884,406 | B2 * | 1/2024 | Shih | G05D 1/0011 |
| 12,202,611 | B2 * | 1/2025 | Yagihashi | B64D 17/80 |
| 12,258,134 | B1 * | 3/2025 | Alrousan | B64D 17/80 |
| 2007/0272801 | A1 * | 11/2007 | Hilliard | B64D 17/025<br>244/142 |
| 2017/0253339 | A1 * | 9/2017 | Berland | B64D 17/18 |
| 2025/0074604 | A1 * | 3/2025 | Städtler | B64C 31/036 |

OTHER PUBLICATIONS

Guruswamy, G., "Time-Accurate Coupling of Three-Degree-of-Freedom Parachute System with Navier-Stokes Equations", Journal of Spacecraft and Rockets, vol. 54, No. 6, pp. 1278-1283, Nov.-Dec. 2017.

Guruswamy, G., "Grid topology for time-accurate deployment simulation of 2D Parachutes by using Navier-Stokes equations", Aerospace Science and Technology, vol. 142, 108714 (7 pages), 2023.

* cited by examiner

AERODYNAMIC FRAMEWORK FOR PARACHUTE DEPLOYMENT FROM AERIAL VEHICLE

The invention described herein was made by an employee of the United States Government and may be manufactured and used by or for the Government of the United States of America for governmental purposes without the payment of any royalties thereon or therefor.

ORIGIN OF INVENTION

FIELD OF THE INVENTION

The present disclosure relates generally to simulation frameworks and, more particularly, to methods and systems for simulating parachute deployment from an active aerial vehicle.

BACKGROUND OF THE DISCLOSURE

As urban congestion levels continue to rise and aerial vehicle technology advances, the use of air taxis and other airborne transportation methods are expected to increase in the coming years. These air taxis can operate using vertical take-off and landing (VTOL) configurations that enable access to, and maneuverability within, urban and suburban environments. Whether operating with passengers on-board or flying over densely populated areas, air taxis and other aerial vehicles can require intensive safety measures to prevent harm to passengers, property, and nearby civilians in the case of propulsion failure. Unlike traditional aircraft, air taxis may be unable to glide through the air in the event of propulsion system failure. As such, it is contemplated that flight and safety organizations are likely to mandate the use of safety mechanisms, such as parachutes, to operate air taxis safely in congested urban locations. Prior to the construction and testing of parachutes or other safety measures for air taxis, accurate and efficient simulations of various designs may be necessitated.

Aerodynamic simulations for these air taxis may need to use computational fluid dynamics codes (CFD) to generate accurate data for future design endeavors. However, current CFD codes do not possess the capability to adequately model and simulate air taxi operations that include parachute deployment in mid-flight. The accurate simulation of air taxi parachute deployment can involve complex flows over and from multiple propulsion systems, such as propellers, as well as fluid-structure interactions involved in the deployment and opening of a parachute. Further, the design and testing of parachutes that are tuned to specific air taxi products can require extensive parametrization of design variables. Environmental conditions, such as wind speed, can similarly affect the parachute deployment, such that the analysis of each design within a variety of environmental conditions is desired.

Accordingly, methods and systems for rapidly and efficiently simulating parachute deployment from aerial vehicles are desirable.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a computer-implemented method for determining landing conditions of an aerial vehicle includes receiving an input model representing the aerial vehicle with an internally-stored parachute and pre-determined environmental conditions, initiating a computational fluid dynamics (CFD) simulation for flight of the aerial vehicle in the pre-determined environmental conditions, receiving, from a simulation database, pre-computed acrodynamic quantities for representing deployment of the internally-stored parachute and descent of the aerial vehicle, and coupling one or more trajectory equations with the pre-computed aerodynamic data and structural quantities of the aerial vehicle to simulate descent and landing of the aerial vehicle in the pre-determined environmental conditions via a deployed parachute.

In another embodiment, a system for generating landing condition data for an aerial vehicle includes an aerial vehicle simulation engine operable to construct an aerial vehicle landing simulation database from input models, user-provided trajectory equations, and environmental conditions. The aerial vehicle simulation engine includes a computational fluid dynamics solver operable to simulate flight and descent of an aerial vehicle with an internally-stored parachute, a simulation data extraction module operable to extract simulation data from the computational fluid dynamics and user-provided trajectory equation solvers related to descent and landing via the internally-stored parachute, and a database construction module operable to construct the aerial vehicle landing simulation database using the extracted simulation data for a plurality of input models, a plurality of environmental conditions, or a combination thereof.

In a further embodiment, a computer-implemented method for generating a simulation database of landing conditions for one or more aerial vehicles includes receiving an input model representing the one or more aerial vehicles with an internally-stored parachute, simulating flight of the one or more aerial vehicles via computational fluid dynamics (CFD) software in a plurality of environmental conditions, the flight including a failure of a propulsion system of the one or more aerial vehicles, simulating deployment of the internally-stored parachute and landing of the one or more aerial vehicles in the plurality of environmental conditions, extracting simulation data for each of the one or more aerial vehicles in the plurality of environmental conditions, the simulation data representing aerodynamic quantities for representing deployment of the internally-stored parachute and descent of the aerial vehicle, and constructing a database of simulation data including the one or more aerial vehicles in each environmental condition of the plurality of environmental conditions.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
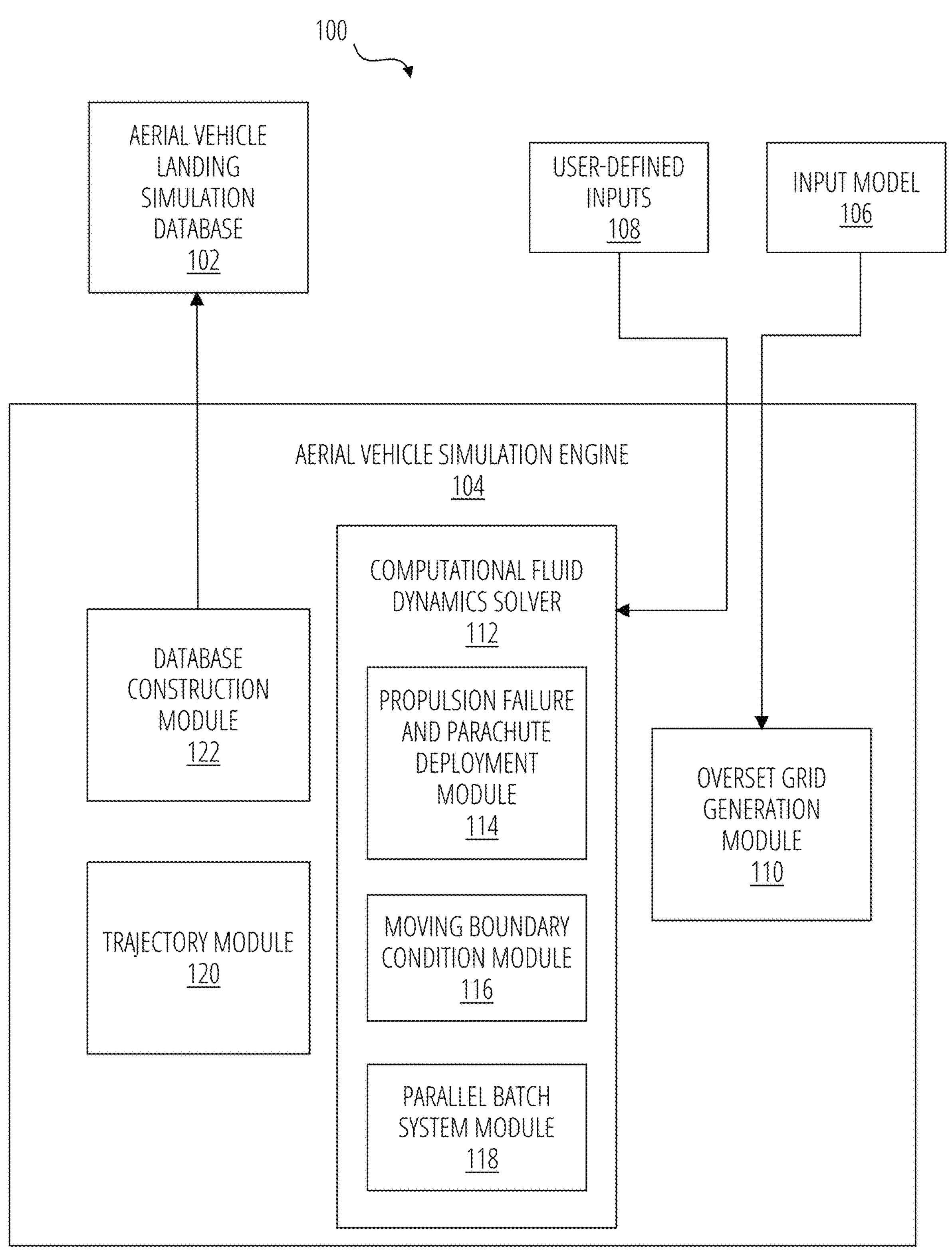
FIG. 1 is a schematic view of an example of a system for generating landing condition data for an aerial vehicle, according to one or more embodiments consistent with the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to simulation frameworks and, more particularly, to methods and systems for enabling simulation of parachute deployment from an active aerial vehicle. The disclosed embodiments can include methods and systems operable to enable simulation of both the flight and descent of aerial vehicles, such as air taxis or other vertical take-off and landing (VTOL) vehicles. The simulated descent of these aerial vehicles can include failure of a propulsion system of the aerial vehicle and subsequent deployment of an internally-stored parachute for safe landing.

The disclosed methods and systems can enable the generation of aerodynamic data and quantities to be utilized in a complete simulation of the nominal flight, propulsion failure, parachute deployment and effect on the flight, and landing of aerial vehicles, such as drag coefficients, weight, thrust, and lift forces, and moment, center of pressure, and pressure coefficient. The methods and systems disclosed herein can simulate the deployment and opening of the parachute as the aerial vehicle descends, and can utilize a moving boundary condition to simulate the parachute canopy. The disclosed embodiments can utilize an overset grid that includes body-fitted meshes for the aerial vehicle, the parachute canopy, and the parachute hole overlaid on a background mesh. Further, the disclosed systems and methods can simulate oscillatory breathing of the deployed parachute to better capture the physical deformation and oscillation of these parachutes during descent. The enhanced simulation capabilities provided by the disclosed systems and embodiments can further improve the operation of existing computational fluid dynamics software. While current software requires the pre-deployment of parachutes, or actively descending parachutes, for an initial condition, the disclosed embodiments can enable modeling of the aerial vehicle and its aerodynamic data before, during, and after parachute deployment, as well as the use of precomputed acrodynamic data for complete simulations. These methods and systems can be provided in a "plug-and-play" manner to existing CFD software to directly improve the performance of these solvers and the machines on which they are run.

The simulations performed in the disclosed methods and systems can represent a variety of environmental conditions in which the aerial vehicle can be operated, and can test a variety of aerial vehicle and parachute designs. The disclosed embodiments can further be utilized in the construction of a database comprising extracted simulation data for a plurality of aerial vehicles, parachutes, and environmental conditions. The database can be utilized via the disclosed systems and methods to design or test proposed aerial vehicles. The robust aerial vehicle landing simulation database can be accordingly employed by designers and engineers to determine and test safe landing requirements for a physical aerial vehicle prior to prototyping and testing. Through the use of the database of simulation data, significant reductions in simulation time can be realized as the complexities of parachute deployment can be precomputed. While the disclosed methods and systems can further simulate the proposed aerial vehicle, the constructed database can be used for rapid design and verification of landing systems without additional computational cost.

FIG. 1 is a schematic view of an example system 100 for generating landing condition data for an aerial vehicle, according to one or more embodiments consistent with the present disclosure. The system 100 can be utilized in the creation of an aerial vehicle landing simulation database 102 which can be employed in the design and development of physical aerial vehicles. The aerial vehicle landing simulation database 102 can include flight, descent, and landing data for a plurality of simulated aerial vehicles, landing systems (e.g., parachutes and use of parachutes attached to aerial vehicles), and environmental conditions. The accumulated data included in the aerial vehicle landing simulation database 102 can enable designers and engineers to rely on in-silico trials for initial design considerations of safety systems for air taxis and other electric vertical take-off and landing (cVTOL) crafts. The generation of the aerial vehicle landing simulation database 102 via the system 100 can frontload any computational overhead and simulation time, such that the aerial vehicle landing simulation database 102 can provide readily-available data during the design and complete simulation process without a need for the active simulation of complex parachute deployment equations. As disclosed below in the discussion of FIG. 2, the aerial vehicle landing simulation database 102 can receive proposed parameters for an aerial vehicle, landing system, environmental conditions, or a combination thereof to provide a tuned landing system design.

To generate the aerial vehicle landing simulation database 102, the system 100 can include an aerial vehicle simulation engine 104 operable to perform simulations of various aerial vehicles in various environments and construct the aerial vehicle landing simulation database 102 from data extracted from these simulations. The aerial vehicle simulation engine 104 can receive one or more input models 106 that represent physical aerial vehicles to be simulated therein, such that the input models 106 include designs for the aerial vehicle to be tested and a possible landing system (such as an internally-stored parachute, which is a parachute attached to the aerial vehicle that is stored inside a body compartment of the aerial vehicle until deployment through deployment mechanism, such as an exterior door or cover of the aerial vehicle). The input models 106 can be provided by a user for the operation of the aerial vehicle simulation engine 104, or can be sourced from a compiled set of input models 106 for automated input and processing. Similarly, the input models 106 can be accompanied by one or more user-defined inputs 108 to the aerial vehicle simulation engine 104. In some embodiments, the user-defined inputs 108 can include environmental conditions (e.g., wind speed, humidity, air temperature, flight altitude, etc.) that may be present in the flight environment of the aerial vehicles represented by the input models 106. The user-defined inputs 108 can be provided to the aerial vehicle simulation engine 104 along with the input models 106 to enable the simulation of the various aerial vehicles in a plurality of environments to better parametrize the simulation data.

In some embodiments, the aerial vehicle simulation engine 104 can utilize an overset grid generation module 110 to enable the simulation of the aerial vehicles and systems. The overset grid generation module 110 can construct an overset grid that includes an aerial vehicle mesh, a parachute canopy mesh, and a parachute hole mesh. These meshes can be body-fitted to each of the aerial vehicle, parachute canopy, and parachute hole that can be provided in the input model 106. The body-fitted meshes can enable accurate simulation of flight, descent, and landing of the aerial vehicle and landing system, such that the parachute of the landing system can be simulated as deployed and unfurled midflight. The variety of meshes included in the overset grid can further enable high-resolution simulations at key areas of the input model 106, such as around the body of the aerial vehicle and canopy and hole of the parachute. These meshes can be combined with a coarser background mesh that fills a remainder of the simulation area, such that each of the body-fitted meshes can be overlappingly combined and can interact in the overset grid via the overset grid generation module 110.

Using the overset grid generated via the overset grid generation module 110, the aerial vehicle simulation engine 104 can further utilize a computational fluid dynamics solver 112 for simulating the flight, descent, and landing of the input models 106. The computational fluid dynamics solver 112 can be a readily-available software package (e.g., the National Aeronautics and Space Administration's OVERFLOW) or can be a custom, proprietary, or commercially-available CFD solver. In some embodiments, the computational fluid dynamics solver 112 can include a propulsion failure and parachute deployment module 114 operable to emulate failure of a propulsion system of the aerial vehicle during flight, such as via the stalling of one or more propellers of the aerial vehicle. The simulation of the failure of the propulsion system can be triggered to initiate the descent of the aerial vehicle that can require the use of the deceleration system, such as a parachute, to safely land the aerial vehicle. As such, the propulsion failure and parachute deployment module 114 can further trigger deployment of an internally-stored parachute during or after failure of the propulsion system. The simultaneous or sequential triggering of propulsion failure and parachute deployment can mimic real-world operations of an aerial vehicle during an emergency, such that the computational fluid dynamics solver 112 can accurately simulate how an aerial vehicle's safety system performs. Prior to propulsion system failure and parachute deployment, the internally-stored parachute can be stored within a body of the simulated aerial vehicle, and both the body-fitted meshes for the parachute and the parachute itself can be hidden in the simulation of flight.

Following deployment of the internally-stored parachute, however, the computational fluid dynamics solver 112 can utilize a moving boundary condition module 116 to simulate the canopy of the deployed parachute as a moving boundary condition. The moving boundary condition of the deployed parachute can provide an upper boundary surface and lower boundary surface that can each interact with the simulation environment. Further, the moving boundary condition module 116 can provide an "blanked" to prevent flow through the moving boundary condition of the deployed parachute, such that a central boundary surface is defined between grid lines of the upper and lower boundary surfaces. These three grid lines/boundary surfaces can translate within the body-fitted mesh of the overset grid generated via the overset grid generation module 110, while the upper and lower boundary surfaces remain connected through the background mesh to physically constrain the motion and shape of the deployed parachute. As such, the computational fluid dynamics solver 112 can provide moving grid capabilities to accurately simulate the deployment and unfurling of the parachute. In some embodiments, the computational fluid dynamics solver 112 and the moving boundary condition module 116 can further enable the simulation of oscillatory breathing of the deployed parachute during flight. The oscillatory breathing can account for bulging and deformation of the parachute during descent, and can include any deviation of the parachute from the mean position of the deployed canopy, such that the true performance of the parachute and landing system can be assessed.

As the overset grid of the overset grid generation module 110 can be densely refined in the key areas, and the computational fluid dynamics solver 112 can utilize moving boundary conditions in complex flow conditions, the computational fluid dynamics solver 112 can include significant computational overhead. As such, in some embodiments the computational fluid dynamics solver 112 can further include a parallel batch system module 118. The parallel batch system module 118 can be operable to split the simulation into multiple parallel processes that can be simultaneously run by a plurality of devices, processors, or cores. This parallel batch system module 118 can enable the splitting of the simulation in a prescribed manner that will enable the simultaneous solution of individual areas of the overset grid without breaking any interconnectivity therein. The parallelization provided by the parallel batch system module 118 can enable the rapid simulation of the intensive calculations performed by the computational fluid dynamics solver 112 through the distribution of the high computational load across the plurality of devices, processors, or cores. As such, the parallel batch system module 118 can increase simulation efficiency and reduce the time required for each individual aerial vehicle simulation in each environmental condition. As such, the computational fluid dynamics solver 112 and aerial vehicle simulation engine 104 can be utilized in the simulation of a plurality of aerial vehicle designs, deceleration system and parachute designs, and environmental conditions to construct a robust aerial vehicle landing simulation database 102.

Following, or during, the simulation of the nominal flight, descent, and landing of the aerial vehicle in the computational fluid dynamics solver 112, the aerial vehicle simulation engine 104 can further employ a trajectory module 120 to extract simulation data therefrom. In some embodiments, the extracted simulation data can be selected from the group consisting of maximum velocity during descent, time to ground after deployment, velocity at ground level, distortion of parachute canopy, acceleration of aerial vehicle during deployment, applied forces during deployment and descent, and any combination thereof. The extracted simulation data can be further processed and sorted via the trajectory module 120 to enable an operator or user to clearly view and understand the results of the performed simulation. The extracted simulation data can include data ranging from the initial flight, to deployment and unfurling of the parachute, through to physical landing of the aerial vehicle via the landing system, such that the trajectory module 120 can provide data for each important phase of the simulation. The trajectory module 120 can accordingly extract key parameters and resultant forces for future simulation of the aerial vehicles and deployed parachutes, thereby obviating the need to re-simulate deployment and perturbed motion of the aerial vehicle.

Using the data extracted via the simulation data extraction module 120, the aerial vehicle simulation engine 104 can employ a database construction module 122 to construct the aerial vehicle landing simulation database 102. The extracted simulation data can be compiled for the plurality of input models, plurality of environmental conditions, or a combination thereof, such that the aerial vehicle landing simulation database 102 can include various design considerations and possible deployment locations. The aerial vehicle landing simulation database 102 can be stored on physical servers, cloud-based storage, or any other readily-accessible medium capable of storing vast amounts of simulation data for use in designing aerial vehicles and landing systems. The aerial vehicle landing simulation database 102 can be constructed via the aerial vehicle simulation engine 104 to prevent the necessity of additional simulations and computational overhead during this design process. The database construction module 122 can be utilized in providing aerodynamic quantities, such as drag and thrust forces, drag coefficient, etc., for the solution of trajectory equations for further simulation of aerial vehicle landing. In some embodiments, up to 90% of computational time can be attributed to the computation of these aerodynamic quantities to obtain values for motion of the aerial vehicles. As such, computational time can be significantly reduced in future simulations with the pre-solution of these acrodynamic quantities that would otherwise dominate the computational complexity and time of CFD solvers.

Figure 2:
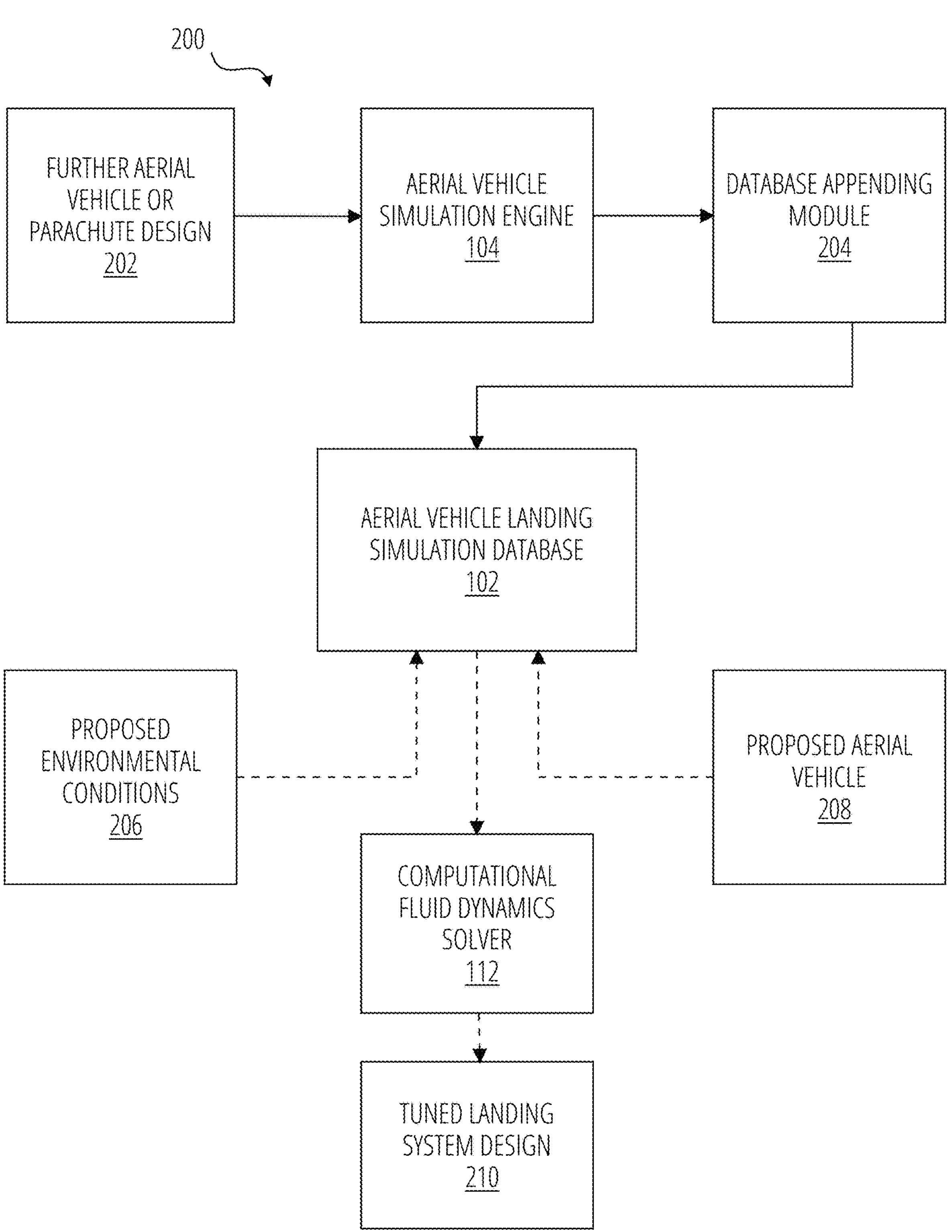
FIG. 2 is a schematic view of an example of a system for appending landing condition data to an existing aerial vehicle landing simulation database and providing a landing system design for proposed parameters, according to one or more embodiments consistent with the present disclosure.

FIG. 2 is a schematic view of an example system 200 for appending landing condition data to an existing aerial vehicle landing simulation database 102 and providing a landing system design for proposed parameters, according to one or more embodiments consistent with the present disclosure. In some embodiments, the system 200 can fully incorporate the system 100 of FIG. 1 therein, while the illustrated embodiment depicts at least the inclusion of the aerial vehicle landing simulation database 102 and aerial vehicle simulation engine 104 therein. The system 200 can be utilized following construction of the aerial vehicle landing simulation database 102 via the system 100 of FIG. 1, such that the aerial vehicle landing simulation database 102 can be actively modified and utilized.

In some embodiments, the system 200 can include one or more further aerial vehicle or parachute designs 202 that can be provided to the aerial vehicle simulation engine 104 following construction of the aerial vehicle landing simulation database 102. These further aerial vehicle or parachute designs 202 can include adjusted parameters, new materials, or entirely new designs to be added to the aerial vehicle landing simulation database 102. The further aerial vehicle or parachute design 202 can be meshed, simulated, and data can be extracted therefrom via the aerial vehicle simulation engine 104, as described in the discussion of FIG. 1. The aerial vehicle simulation engine 104 can utilize a database appending module 204 to then provide the newly extracted simulation data to the aerial vehicle landing simulation database 102. As such, the aerial vehicle landing simulation database 102 can be a growing and evolving tool that can be expanded via further simulations as needed. In some embodiments, the database appending module 204 can be a separate component from the aerial vehicle simulation engine 104. In further embodiments, however, it is contemplated that the database appending module 204 can be included within the aerial vehicle simulation engine 104, or as a part of the database construction module 122 of FIG. 1, without departing from the scope of this disclosure.

The aerial vehicle landing simulation database 102 can be in communication with one or more users or devices that can be involved in the design of physical aerial vehicles to be utilized as air taxis or other flying transports. These users or devices can provide proposed environmental conditions 206 and/or proposed aerial vehicles 208 that require landing systems or parachutes for safe landing in the event of propulsion failure. The aerial vehicle landing simulation database 102 can be in communication with the computational fluid dynamics solver 112, which can receive structural quantities from the proposed aerial vehicles 208. The aerial vehicle landing simulation database 102 can further provide the acrodynamic quantities used in the deployment of a parachute and landing of the aerial vehicle, based upon the proposed environmental conditions 206. Through the coupling of the structural quantities and aerodynamic quantities with user-provided trajectory equations for the proposed aerial vehicle 208, rapid simulation of the full flight (parachute deployment, landing) can be performed for the proposed aerial vehicle 208 and proposed environmental conditions 206. As discussed above, the pre-computation of the aerodynamic quantities stored in the aerial vehicle landing simulation database 102 can significantly reduce computational overhead, such that design and in-silico testing via the system 200 can be rapidly performed to produce a tuned landing system design 210.

Figure 3:
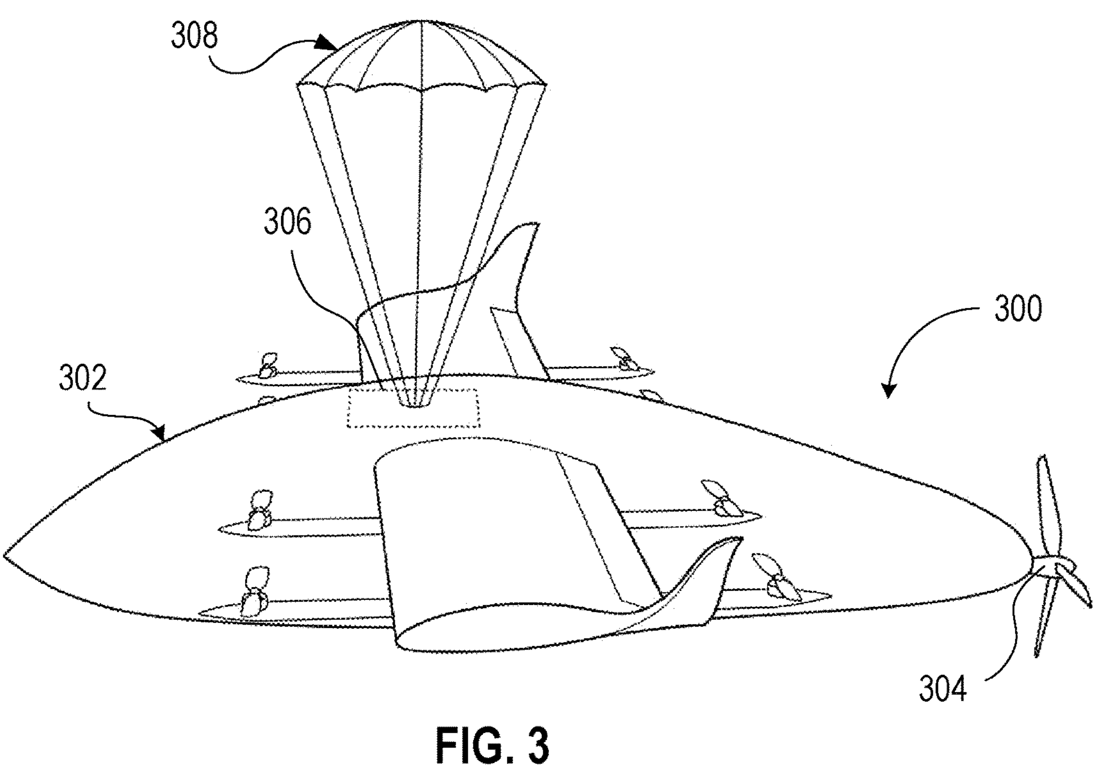
FIG. 3 is a schematic side view of an example of an aerial vehicle to be simulated via the systems of FIGS. 1-2, according to one or more embodiments consistent with the present disclosure.

FIG. 3 is a schematic side view of an example aerial vehicle 300 to be simulated via the systems 100, 200 of FIGS. 1-2, according to one or more embodiments consistent with the present disclosure. The example aerial vehicle 300 can provide a body 302 that is aerodynamically tuned for flight with one or more passengers or other payload onboard. The example aerial vehicle 300 can include one or more propulsion systems 304 on the body 302, such that the propulsion system 304 can power the flight of the example aerial vehicle 300 during standard operation. The propulsion system 304 can include a single propeller, multiple propellers, engines, or any other form of airborne propulsion, without departing from the scope of this disclosure. In some embodiments, the propulsion system 304 can be powered via electric or hydrogen power, and the failure of these power systems or the propulsion system 304 itself can lead to an emergency situation. Unlike many airplanes and other aircraft, the example aerial vehicle 300 (and other VTOLs or air taxis) can be unable to glide safely to the surface as they fly at low altitude.

As such, the example aerial vehicle 300 can require an emergency deceleration system that enables the safe landing of any passengers or payloads during failure of the propulsion system 304. As such, the body 302 can provide a deployment mechanism 306 on a surface thereof, the deployment mechanism 306 operable to open and eject a parachute 308 in the event of propulsion failure. The deployment mechanism 306 can be directly interfaced with the propulsion system 304, such that the failure of the propulsion system 304 can instantly trigger the deployment mechanism 306. In further embodiments, however, the deployment mechanism 306 can be controlled via sensors (not shown) that detect high g-forces, stalled motions, or other flight conditions indicating failure of the propulsion system 304. Upon triggering, the deployment mechanism 306 can release the parachute 308, which can then unfurl and open to slow and control descent of the example aerial vehicle 300.

Figure 4:
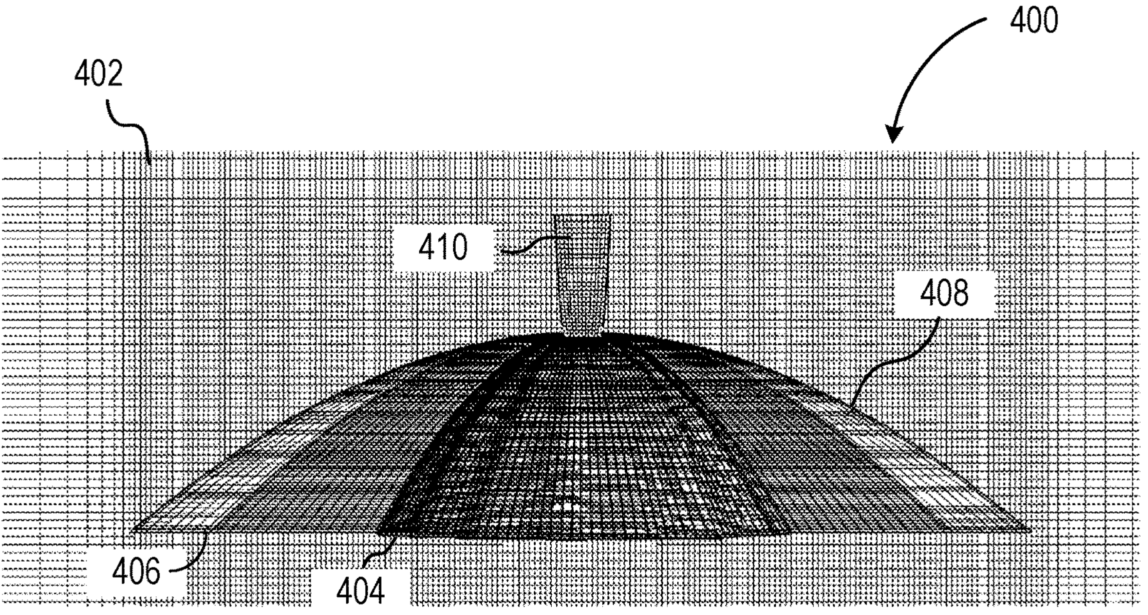
FIG. 4 is a schematic view of an example of an overset parachute grid to be utilized by the computational fluid dynamics solver of FIG. 1, according to one or more embodiments consistent with the present disclosure.

FIG. 4 is a schematic view of an example overset parachute grid 400 to be utilized by the computational fluid dynamics solver 112 of FIG. 1, according to one or more embodiments consistent with the present disclosure. FIG. 4 illustrates an enhanced view of the example overset parachute grid 400 that could be present in the overset grid generated via the overset grid generation module 110 around the parachute 308 of FIG. 3. The example overset parachute grid 400 can include a background mesh 402 which provides a base for a plurality of body-fitted meshes to be connected thereon. The body-fitted meshes can be generated at or around the partially deployed canopy 404 depicted in FIG. 4, such that the opening and breathing of the partially deployed canopy 404 into the fully deployed canopy 406 can be captured via the body-fitted meshes. The full parachute mesh 408 can provide the body-fitted mesh that encompasses the entire region of the example overset parachute grid 400 in which the fully deployed canopy 406 could be located. The example overset parachute grid 400 can further include a hole mesh 410 for a hole in the parachute 308 of FIG. 3 that enables air passage therethrough. The hole mesh 410 can be seen in FIG. 4 as protruding vertically upward from the partially deployed canopy 404 and fully deployed canopy 406, such that the simulated flow of air can be accurately captured therethrough. The example overset parachute grid 400, as shown, can enable the use of the moving canopy boundary condition of the moving boundary condition module 116 of FIG. 1, and can also enable the capture of complex fluid flows and turbulence within the computational fluid dynamics solver 112 of FIG. 1.

Figure 5:
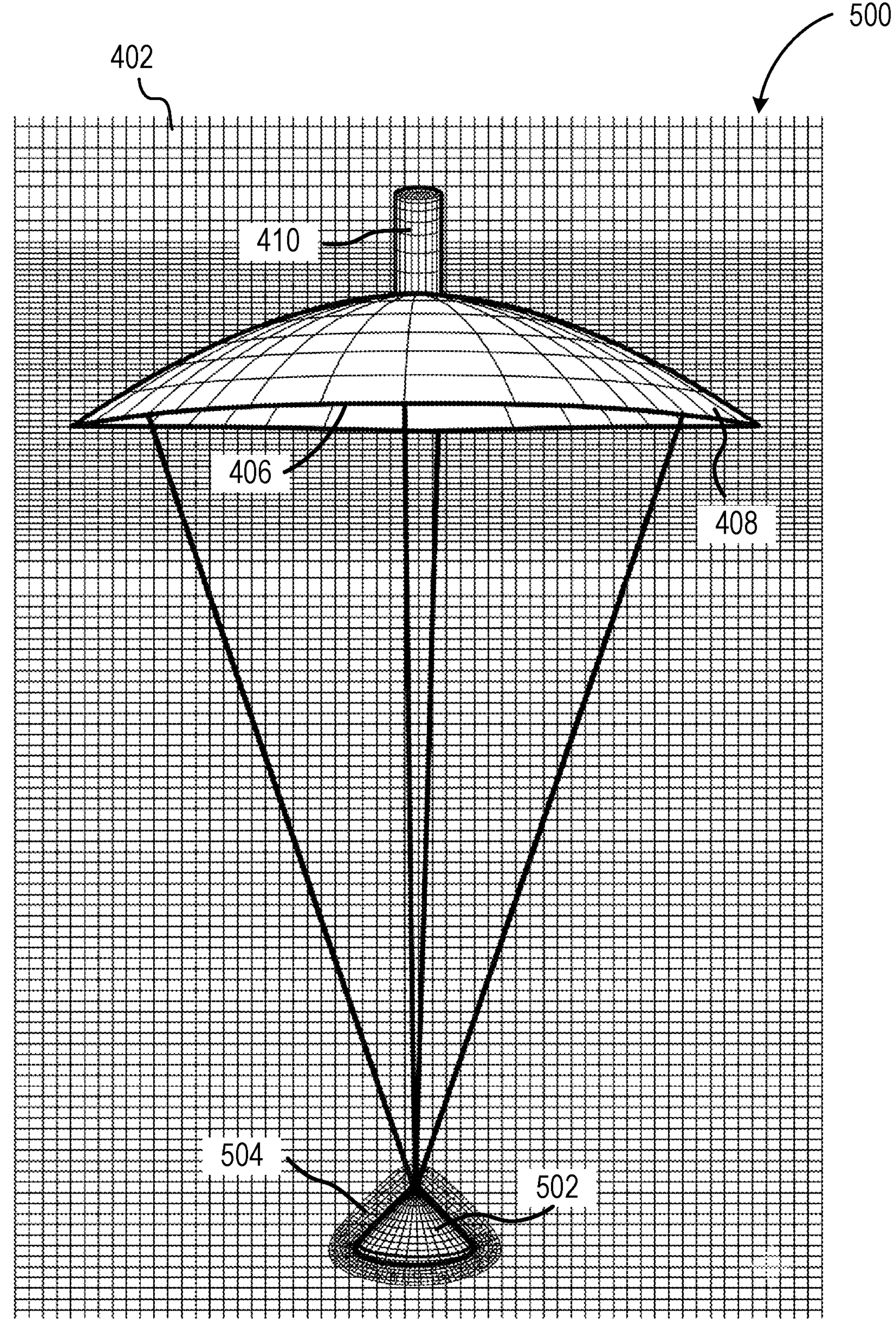
FIG. 5 is a schematic view of an example of an overset grid for an aerial vehicle and fully deployed canopy, according to one or more embodiments consistent with the present disclosure.

FIG. 5 is a schematic view of an example overset grid 500 for an aerial vehicle 502 and fully deployed canopy 406, according to one or more embodiments consistent with the present disclosure. The example overset grid 500 can include the example overset parachute grid 400, such that the example overset parachute grid 400 is incorporated with a mesh of an aerial vehicle 502 via the background mesh 402. It should be noted that, while depicted as a capsule in FIG. 5, the aerial vehicle 502 can further be the example aerial vehicle 300 of FIG. 3 or any other proposed aerial vehicle 208 of FIG. 2, without departing from the scope of the present disclosure.

The example overset grid 500 can include an aerial vehicle mesh 504 that is body-fitted to the aerial vehicle 502 of interest for the present simulation. The aerial vehicle mesh 504 can enable the accurate simulation of flight and descent of the aerial vehicle 502, prior to and during deployment of the hole full parachute mesh fully deployed canopy 406. Following deployment of the fully deployed canopy 406, the background mesh 402 can provide coupling and interaction between the flows of the aerial vehicle mesh 504 and the full parachute mesh 408 and hole mesh 410. The example overset grid 500 can accordingly enable the accurate capturing of complex flows over any pertinent structures of the aerial vehicle 502 and fully deployed canopy 406 in a single, solvable simulation.

Figure 6:
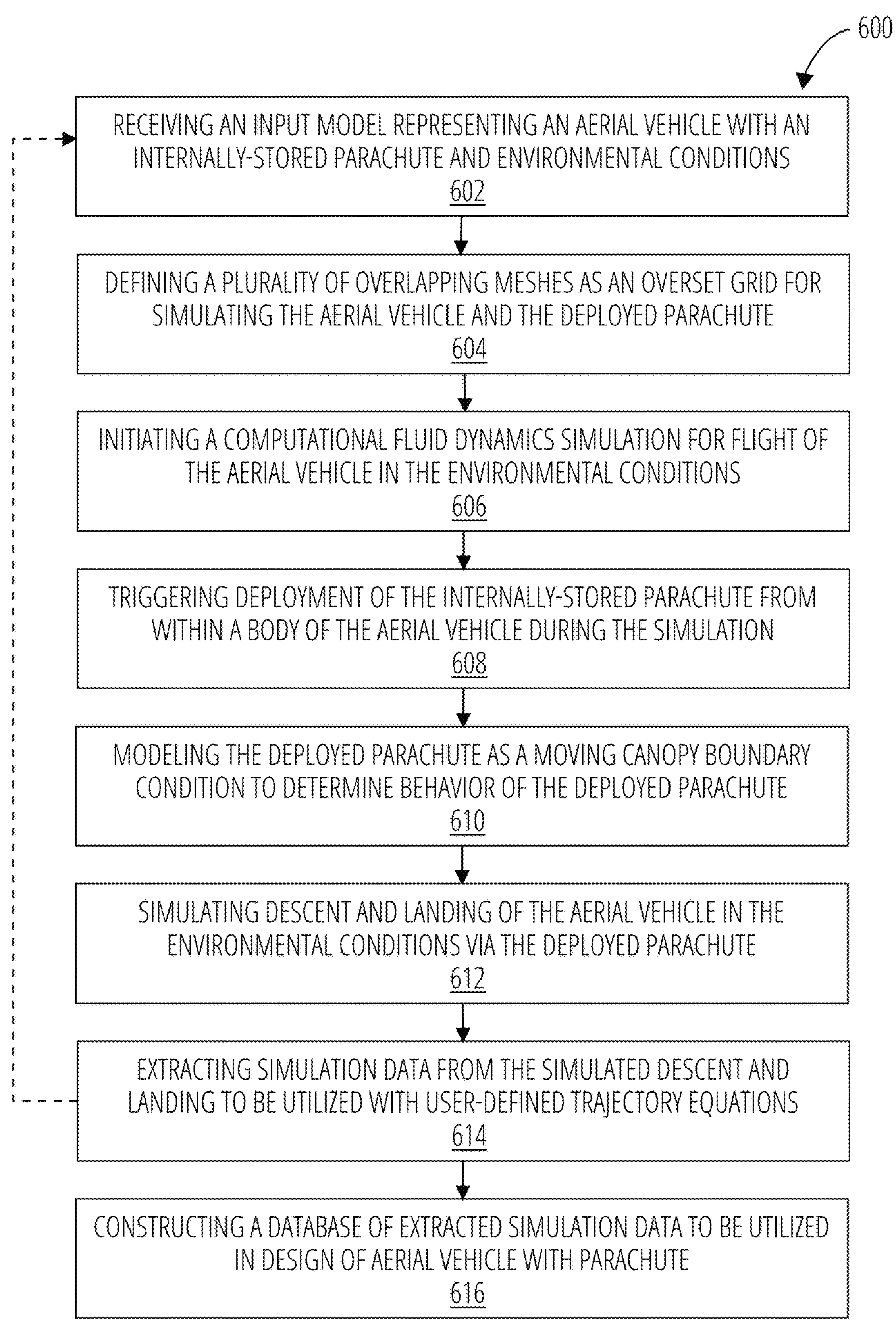
FIG. 6 illustrates an example of a computer-implemented method for simulating descent of an aerial vehicle and constructing an aerial vehicle landing simulation database using extracted simulation data, according to one or more embodiments consistent with the present disclosure.
Figure 7:
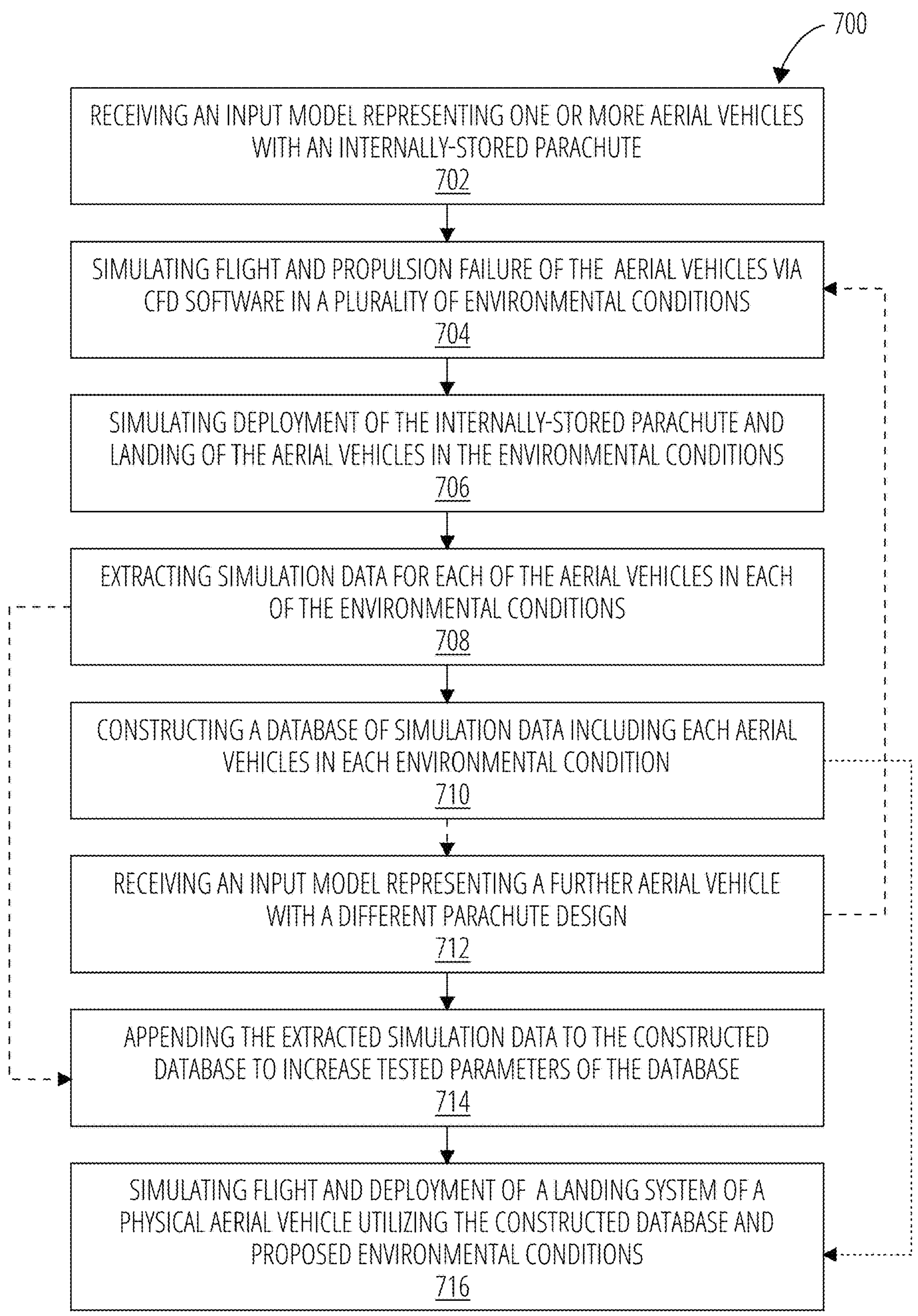
FIG. 7 illustrates an example of a computer-implemented method for constructing the aerial vehicle landing simulation database using extracted simulation data and designing a landing system utilizing the constructed aerial vehicle landing simulation database, in accordance with one or more embodiments of the present disclosure.

In view of the structural and functional features described above, example methods will be better appreciated with reference to FIGS. 6-7. While, for purposes of simplicity of explanation, the example methods of FIGS. 6-7 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods, and conversely, some actions may be performed that are omitted from the description.

FIG. 6 illustrates an example computer-implemented method 600 for simulating descent of an aerial vehicle and constructing an aerial vehicle landing simulation database using extracted simulation data, according to one or more embodiments consistent with the present disclosure. The method 600 may be implemented by the system 100 of FIG. 1 and/or the system 200 of FIG. 2. Thus, reference may be made to the example of FIGS. 1-5 in the example method 600 of FIG. 6. The method 600 can begin at 602 with receiving one or more input models (e.g., the input model 106) each representing an aerial vehicle (e.g., the proposed aerial vehicle 208, the example aerial vehicle 300, the aerial vehicle 502) with an internally-stored parachute (e.g., the parachute 308) and environmental conditions (e.g., the proposed environmental conditions 206) at 602. The one or more input models can represent each desired design of aerial vehicle and parachute to be simulated for use in later design of physical aerial vehicles. The environmental conditions can represent each desired environment or set of flight conditions in which the aerial vehicle can be deployed and utilized, such that a designer can plan for design differences of the aerial vehicle in a windy city, an arid environment, or a cold locale.

The method 600 can continue at 604 with defining (e.g., via the overset grid generation module 110) a plurality of overlapping meshes (e.g., the full parachute mesh 408, hole mesh 410, aerial vehicle mesh 504) as an overset grid (e.g., the example overset parachute grid 400 and example overset grid 500) for simulating the aerial vehicle and the deployed parachute at 604. The overlapping meshes can be body-fitted meshes for each pertinent component of each aerial vehicle. The overset grid can accordingly include an aerial vehicle mesh, a parachute canopy mesh, and a parachute hole mesh overlaid on a background mesh (e.g., the background mesh 402). The background mesh can provide interconnectivity and coupling between the varied, body-fitted meshes, and can enable simulation of the general flight area removed from each component.

The method 600 can continue at 606 with initiating a computational fluid dynamics (CFD) simulation (e.g., via the aerial vehicle simulation engine 104 and computational fluid dynamics solver 112) for flight of the aerial vehicle in the environmental conditions at 606. The CFD simulation can capture the complex fluid flows around each component using the body-fitted meshes of the overset grid, and can further capture turbulence, oscillatory breathing of the parachute, and other phenomena. In some embodiments, the CFD simulation is performed using a parallel batch system (PBS) protocol (e.g., via the parallel batch system module 118), which can enable the parallelization of the simulation to drastically increase solution speed. The CFD simulation can begin with take-off of the aerial vehicle, or can begin with the aerial vehicle already in flight at a cruising altitude.

Regardless of the initial conditions of the CFD simulation, the method 600 can continue at 608 with triggering deployment of the internally-stored parachute from within a body of the aerial vehicle during the simulation (e.g., via the propulsion failure and parachute deployment module 114). The internally-stored parachute can be released via a deployment mechanism (e.g., the deployment mechanism 306) that releases the internally-stored parachute from the body of the aerial vehicle. In some embodiments, the deployment of the internally-stored parachute can be triggered as a result of failure of a propulsion system (e.g., the propulsion system 304) of the aerial vehicle during flight, wherein the failure of the propulsion system triggers the deployment of the internally-stored parachute. As discussed above, aerial vehicles such as air taxis and other eVTOL craft can be unable to glide safely following propulsion system failure. Thus, the failure of a propulsion system in the simulated environment can directly trigger the deployment of the parachute as a safety feature to safely recover any passengers or payloads.

The method 600 can continue at 610 with modeling the deployed parachute as a moving canopy boundary condition (e.g., via the moving boundary condition module 116) to determine behavior of the deployed parachute at 610. The deployed parachute can be modeled as three boundary layers on the overset grid: an upper surface, a lower surface, and a blanked intermediate surface. The upper and lower surfaces can be treated as no-flow boundary conditions, while the blanked surface prevents any flow thereacross. As the parachute unfurls and opens, these three boundaries can translate within the body-fitted mesh as moving boundary conditions, thus capturing the accurate deployment of the parachute from a completely stored position. In some embodiments, the modeling of the deployed parachute as a moving canopy boundary condition further comprises simulating oscillatory breathing of the deployed parachute during descent of the aerial vehicle. The oscillatory breathing modes of the deployed parachute can capture any bulging or deviation of the deployed parachute from a mean deployed position to determine physical response of the deployed parachute during descent.

The method 600 can continue at 612 with simulating a full descent and landing of the aerial vehicle in the environmental conditions via the deployed parachute. After the parachute has fully deployed, the process of safely descending to the ground can be fully captured and monitored to provide data related to at least landing conditions and descent velocities. During the simulation at 612, or following completion of the simulation, the method 600 can continue at 614 with extracting simulation data (e.g., via trajectory module 120) from the simulated descent and landing to be utilized with user-defined trajectory equations during a design of a physical aerial vehicle with parachute. The extracted simulation data can provide aerodynamic quantities related to the descent and landing of the aerial vehicle that can inform how safe the proposed landing system design is for the aerial vehicle, and can quantify any speeds and forces during landing. In some embodiments, following extraction of the simulation data at 614, the method 600 can continue at 602 with receiving further input models for further aerial vehicles, landing systems, or environmental conditions. The method 600 can then continue cyclically through simulation and data extraction of a plurality of different designs and environments.

In some embodiments, however, the method 600 can continue at 616 with constructing (e.g., via the database construction module 122) a database of extracted simulation data (e.g., the aerial vehicle landing simulation database 102) to be utilized in design of an aerial vehicle with a parachute. The database of extracted simulation data can include data for a plurality of aerial vehicles, landing systems, and environmental conditions, such that a designer can utilize pre-computed aerodynamic quantities (e.g., drag and thrust forces, drag coefficient, or other quantities for the solution of trajectory equations for further simulation of aerial vehicle landing) for the simulation of a physical aerial vehicle and design of an associated landing system. The database can be utilized and modified by external users to enable a unified platform for the safe design of emergency landing systems for air taxis and other eVTOL craft in the case of propulsion system failure.

FIG. 7 illustrates an example computer-implemented method 700 for constructing an aerial vehicle landing simulation database using extracted simulation data and designing a landing system utilizing the constructed aerial vehicle landing simulation database, in accordance with one or more embodiments of the present disclosure. The method 700 can begin at 702 with receiving an input model representing one or more aerial vehicles with an internally-stored parachute. As in the method 600 of FIG. 6, the aerial vehicles can be of differing designs, or with differing landing systems to be provided in the case of propulsion system failure. The method 700 can continue at 704 with simulating flight and propulsion failure of the aerial vehicles via computational fluid dynamics software (e.g., the National Aeronautics and Space Administration's OVERFLOW) in a plurality of environmental conditions. The environmental conditions can include any possible flight conditions for any possible locales in which the aerial vehicles can be deployed.

The method 700 can continue at 706 with simulating deployment of the internally-stored parachute and landing of the aerial vehicles in the environmental conditions. As discussed above, an internally-stored parachute can be deployed from the aerial vehicles during propulsion system failure. The internally-stored parachute can be deployed from a completely closed state, and can be simulated at 706 to actively unfurl and open as it translates away from the aerial vehicle. Each aerial vehicle and deployed parachute can be simulated in each environmental condition to enable granular analysis of how each environmental condition affects the flight, descent, and landing of the aerial vehicles.

The method 700 can continue at 708 with extracting simulation data for each of the aerial vehicles in each of the environmental conditions. As discussed above, a granular analysis can be performed to determine how each environmental condition and design change alter this extracted simulation data. In some embodiments, the extracted simulation data is selected from the group consisting of maximum velocity during descent, time to ground after deployment, velocity at ground level, distortion of parachute canopy, acceleration of aerial vehicle during deployment, applied forces during deployment and descent, and any combination thereof. Using the extracted simulation data, the method 700 can continue at 710 with constructing a database of simulation data including each aerial vehicle in each environmental condition. Similar to the method 600 of FIG. 6, the database can include a plurality of aerial vehicle designs, landing systems, and environmental conditions to provide a designer with specific parametrization of design variables.

In some embodiments. As such, in some embodiments, the method 700 can directly continue at 716 with simulating flight and deployment of a landing system of a physical aerial vehicle utilizing the constructed database and proposed environmental conditions. The database of extracted simulation data can provide all aerodynamic data needed for a designer or user to couple with structural quantities of a physical aerial vehicle, such that external users can leverage the vast amount of data to simulate the full flight of the physical aerial vehicle without requiring the significant computational overhead of computing the aerodynamic quantities. In further embodiments, however, prior to simulating the landing system at 716, the method 700 can continue at 712 with receiving an input model representing a further aerial vehicle with a different parachute design. The method 700 can then continue cyclically through further simulation and data extraction to produce further data related to a further aerial vehicle or different parachute design. The method 700 can then continue at 714 with appending the extracted simulation data to the constructed database (e.g., via the database appending module 204) to increase the tested parameters of the database at 714. As such, the method 700 enables the construction, use, and modification of an aerial vehicle landing simulation database that utilizes in-silico extracted data to accurately predict safe operation of aerial vehicles. The ability to modify the aerial vehicle landing simulation database via the method 700 can ensure a living, evolving database that includes modern and novel designs for direct comparison to previously tested models.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 6. Furthermore, portions of the embodiments may be a computer program product on a computer-readable storage medium having computer readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the specified function. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

Figure 8:
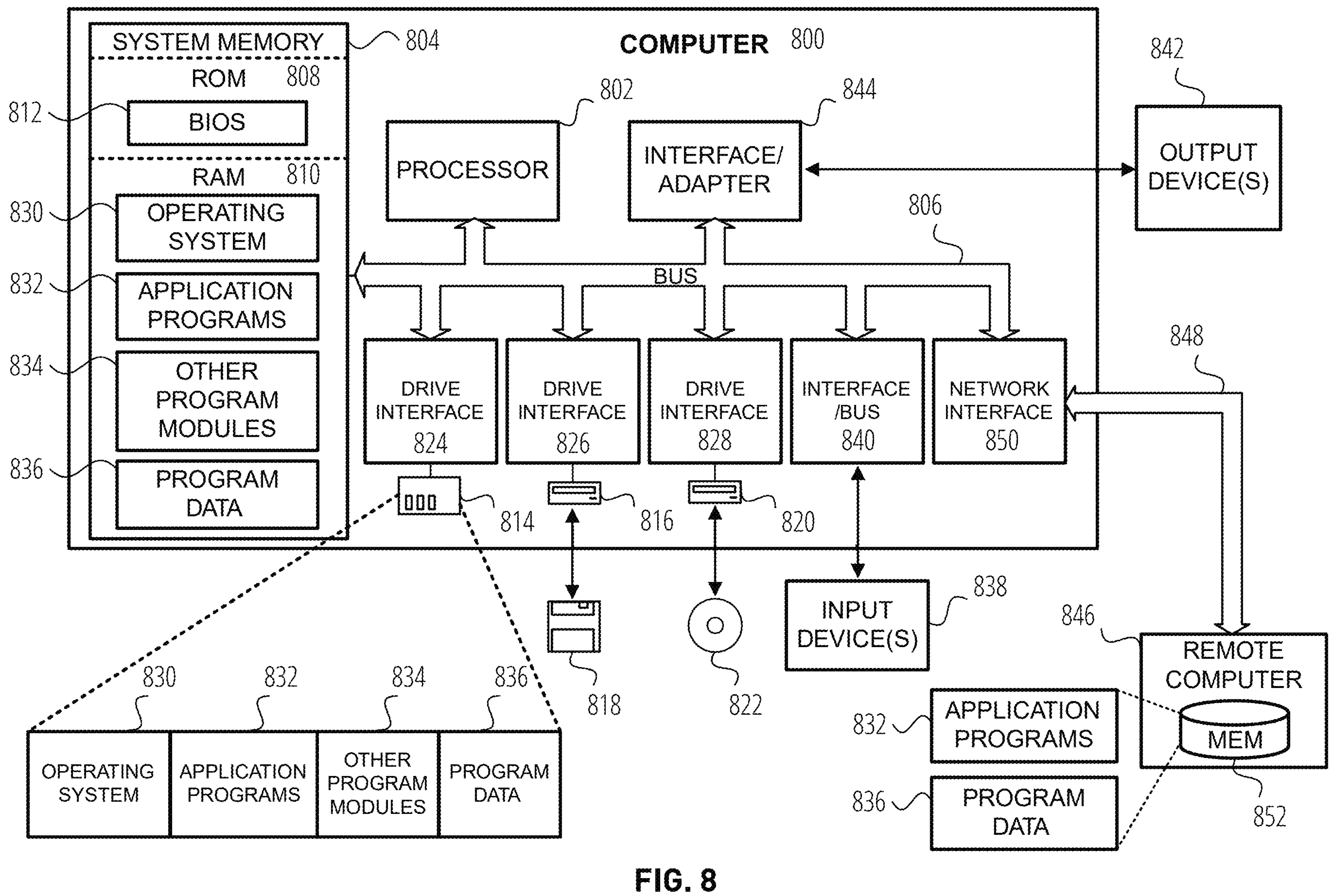
FIG. 8 illustrates an example of a computer system that can be employed to execute one or more embodiments of the present disclosure.

In this regard, FIG. 8 illustrates one example of a computer system 800 that can be employed to execute one or more embodiments of the present disclosure. Computer system 800 can be implemented on one or more general purpose networked computer systems, embedded computer systems, routers, switches, server devices, client devices, various intermediate devices/nodes or standalone computer systems. Additionally, computer system 800 can be implemented on various mobile clients such as, for example, a personal digital assistant (PDA), laptop computer, pager, and the like, provided it includes sufficient processing capabilities.

Computer system 800 includes processing unit 802, system memory 804, and system bus 806 that couples various system components, including the system memory 804, to processing unit 802. System memory 804 can include volatile (e.g. RAM, DRAM, SDRAM, Double Data Rate (DDR) RAM, etc.) and non-volatile (e.g. Flash, NAND, etc.) memory. Dual microprocessors and other multi-processor architectures also can be used as processing unit 802. System bus 806 may be any of several types of bus structure including a memory bus or memory controller, a peripheral bus, and a local bus using any of a variety of bus architectures. System memory 804 includes read only memory (ROM) 808 and random-access memory (RAM) 810. A basic input/output system (BIOS) 812 can reside in ROM 808 containing the basic routines that help to transfer information among elements within computer system 800.

Computer system 800 can include a hard disk drive 814, magnetic disk drive 816, e.g., to read from or write to removable disk 818, and an optical disk drive 820, e.g., for reading CD-ROM disk 822 or to read from or write to other optical media. Hard disk drive 814, magnetic disk drive 816, and optical disk drive 820 are connected to system bus 806 by a hard disk drive interface 824, a magnetic disk drive interface 826, and an optical drive interface 828, respectively. The drives and associated computer-readable media provide nonvolatile storage of data, data structures, and computer-executable instructions for computer system 800. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and ROM 808, including operating system 830, one or more application programs 832, other program modules 834, and program data 836. In some examples, the application programs 832 can include the aerial vehicle simulation engine 104, the overset grid generation module 110, the computational fluid dynamics solver 112, the propulsion failure and parachute deployment module 114, the moving boundary condition module 116, the parallel batch system module 118, the trajectory module 120, the database construction module 122, and the database appending module 204 and the program data 836 can include any of the user-defined inputs 108, the input model 106, the aerial vehicle landing simulation database 102, the tuned landing system design 210, the proposed environmental conditions 206, and the proposed aerial vehicle 208. The application programs 832 and program data 836 can include functions and methods programmed to simulate the safe landing of aerial vehicles using internally-stored parachutes, and to construct a parameterized database of simulation data to be used in the design of aerial vehicles and safety/landing systems, such as shown and described herein.

A user may enter commands and information into computer system 800 through one or more input device 838, such as a pointing device (e.g., a mouse, touch screen), keyboard, microphone, joystick, game pad, scanner, and the like. The input device 838 can enable a user to modify or enter the user-defined inputs 108, the input model 106, the proposed environmental conditions 206, the proposed aerial vehicle 208, and any combination thereof. These and other input devices 838 are often connected to processing unit 802 through a corresponding port interface 840 that is coupled to the system bus, but may be connected by other interfaces, such as a parallel port, serial port, or universal serial bus (USB). One or more output devices 842 (e.g., display, a monitor, printer, projector, or other type of displaying device) is also connected to system bus 806 via interface 844, such as a video adapter.

Computer system 800 may operate in a networked environment using logical connections to one or more remote computers, such as remote computer 846. Remote computer 846 may be a workstation, computer system, router, peer device, or other common network node, and typically includes many or all the elements described relative to computer system 800. The logical connections, schematically indicated at 848, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 800 can be connected to the local network through a network interface or adapter 850. When used in a WAN networking environment, computer system 800 can include a modem, or can be connected to a communications server on the LAN. The modem, which may be internal or external, can be connected to system bus 806 via an appropriate port interface. In a networked environment, application programs 832 or program data 836 depicted relative to computer system 800, or portions thereof, may be stored in a remote memory storage device 852.

Embodiments disclosed herein include:

A. A computer-implemented method for determining landing conditions of an aerial vehicle, the computer-implemented method comprising the steps of receiving an input model representing the aerial vehicle with an internally-stored parachute and pre-determined environmental conditions, initiating a computational fluid dynamics (CFD) simulation for flight of the aerial vehicle in the pre-determined environmental conditions, receiving, from a simulation database, pre-computed aerodynamic quantities for representing deployment of the internally-stored parachute and descent of the aerial vehicle, and coupling one or more trajectory equations with the pre-computed aerodynamic data and structural quantities of the aerial vehicle to simulate descent and landing of the aerial vehicle in the pre-determined environmental conditions via a deployed parachute.

B. A system for generating landing condition data for an aerial vehicle, the system comprising an aerial vehicle simulation engine operable to construct an aerial vehicle landing simulation database from input models, user-provided trajectory equations, and environmental conditions, the aerial vehicle simulation engine including a computational fluid dynamics solver operable to simulate flight and descent of an aerial vehicle with an internally-stored parachute, a simulation data extraction module operable to extract simulation data from the computational fluid dynamics and user-provided trajectory equation solvers related to descent and landing via the internally-stored parachute, and a database construction module operable to construct the aerial vehicle landing simulation database using the extracted simulation data for a plurality of input models, a plurality of environmental conditions, or a combination thereof.

C. A computer-implemented method for generating a simulation database of landing conditions for one or more aerial vehicles, the computer-implemented method comprising the steps of receiving an input model representing the one or more aerial vehicles with an internally-stored parachute, simulating flight of the one or more aerial vehicles via computational fluid dynamics (CFD) software in a plurality of environmental conditions, the flight including a failure of a propulsion system of the one or more aerial vehicles, simulating deployment of the internally-stored parachute and landing of the one or more aerial vehicles in the plurality of environmental conditions, extracting simulation data for each of the one or more aerial vehicles in the plurality of environmental conditions, the simulation data including aerodynamic quantities for representing deployment of the internally-stored parachute and descent of the aerial vehicle, and constructing a database of simulation data including the one or more aerial vehicles in each environmental condition of the plurality of environmental conditions.

Each of embodiments A through C may have one or more of the following additional elements in any combination: Element 1: further comprising: triggering deployment of the internally-stored parachute from within a body of the aerial vehicle during the simulation; modeling the deployed parachute as a moving canopy boundary condition in the predetermined environmental conditions to determine behavior of the deployed parachute; extracting simulation data from the simulated descent and landing of the aerial vehicle to be utilized in a design of a physical aerial vehicle with an internally-stored parachute; and constructing the simulation database from the extracted aerodynamic data, the simulation database including extracted simulation data for a plurality of aerial vehicles in one or more environmental conditions. Element 2: wherein the extracted simulation data is selected from the group consisting of maximum velocity during descent, time to ground after deployment, velocity at ground level, distortion of parachute canopy, acceleration of aerial vehicle during deployment, applied forces during deployment and descent, and any combination thereof. Element 3: wherein modeling the deployed parachute as a moving canopy boundary condition further comprises simulating oscillatory breathing of the deployed parachute during descent of the aerial vehicle. Element 4: further comprising: defining a plurality of overlapping meshes as an overset grid for performing the CFD simulation of the aerial vehicle and the deployed parachute. Element 5: wherein the overset grid includes an aerial vehicle mesh, a parachute canopy mesh, and a parachute hole mesh overlaid on a background mesh. Element 6: wherein the CFD simulation is performed using a parallel batch system (PBS) protocol. Element 7: further comprising: emulating failure of a propulsion system of the aerial vehicle during flight, wherein the failure of the propulsion system triggers the deployment of the internally-stored parachute. Element 8: wherein the computational fluid dynamics solver comprises: a propulsion failure and parachute deployment module operable to emulate failure of a propulsion system of the aerial vehicle during flight and to trigger deployment of the internally-stored parachute during or after failure of the propulsion system.

Element 9: wherein the computational fluid dynamics solver comprises: a moving boundary condition module operable to simulate a canopy of a deployed parachute as a moving boundary condition within the computational fluid dynamics solver. Element 10: wherein the aerial vehicle simulation engine further comprises: an overset grid generation module operable to construct an overset grid for the computational fluid dynamics solver, the overset grid including an aerial vehicle mesh, a parachute canopy mesh, and a parachute hole mesh overlapping on a background mesh. Element 11: further comprising a database appending module operable to receive further extracted simulation data from the aerial vehicle simulation engine and append the further extracted simulation data to a constructed aerial vehicle landing simulation database. Element 12: wherein the aerial vehicle landing simulation database constructed by the aerial vehicle simulation engine is operable to receive proposed aerial vehicle parameters, proposed parachute parameters, proposed environmental conditions, or a combination thereof to provide aerodynamic parameters to the computational fluid dynamics solver, including aerodynamic quantities for representing deployment of the internally-stored parachute and descent of the aerial vehicle. Element 13: further comprising: designing a landing system of a physical aerial vehicle utilizing the simulation database of simulation data and proposed environmental conditions with the computational fluid dynamics software. Element 14: further comprising: receiving an input model representing a further aerial vehicle with an internally-stored parachute of a different design; simulating flight of the one or more aerial vehicles via CFD software in the plurality of environmental conditions, the flight including the failure of a propulsion system of the one or more aerial vehicles; simulating deployment of the internally-stored parachute and landing of the one or more aerial vehicles in the plurality of environmental conditions; extracting simulation data for each of the one or more aerial vehicles in the plurality of environmental conditions; and appending the extracted simulation data to the database to increase one or more tested parameters to be included in the database of simulation data. Element 15: wherein the extracted simulation data is selected from the group consisting of maximum velocity during descent, time to ground after deployment, velocity at ground level, distortion of parachute canopy, acceleration of aerial vehicle during deployment, applied forces during deployment and descent, and any combination thereof. Element 16: further comprising: defining a plurality of overlapping meshes as an overset grid for simulating flight of the one or more aerial vehicles and the deployed parachute. Element 17: wherein the deployed parachute is modeled as a moving canopy boundary condition operable to simulate oscillatory breathing of the deployed parachute during descent of the aerial vehicle.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A computer-implemented method for determining landing conditions of an aerial vehicle, the computer-implemented method comprising the steps of:
receiving an input model representing the aerial vehicle with an internally-stored parachute and pre-determined environmental conditions;
initiating a computational fluid dynamics (CFD) simulation for flight of the aerial vehicle in the pre-determined environmental conditions;
receiving, from a simulation database, pre-computed aerodynamic data, including aerodynamic quantities for representing deployment of the internally-stored parachute and descent of the aerial vehicle; and
coupling one or more trajectory equations with the pre-computed aerodynamic data and structural quantities of the aerial vehicle to simulate descent and landing of the aerial vehicle in the pre-determined environmental conditions via a deployed parachute.

2. The computer-implemented method of claim 1, further comprising:
triggering deployment of the internally-stored parachute from within a body of the aerial vehicle during the simulation;
modeling the deployed parachute as a moving canopy boundary condition in the pre-determined environmental conditions to determine behavior of the deployed parachute;
extracting simulation data from the simulated descent and landing of the aerial vehicle to be utilized in a design of a physical aerial vehicle with an internally-stored parachute; and
constructing the simulation database from the extracted aerodynamic data, the simulation database including extracted simulation data for a plurality of aerial vehicles in one or more environmental conditions.

3. The computer-implemented method of claim 2, wherein the extracted simulation data is selected from the group consisting of maximum velocity during descent, time to ground after deployment, velocity at ground level, distortion of parachute canopy, acceleration of aerial vehicle during deployment, applied forces during deployment and descent, and any combination thereof.

4. The computer-implemented method of claim 2, wherein modeling the deployed parachute as a moving canopy boundary condition further comprises simulating oscillatory breathing of the deployed parachute during descent of the aerial vehicle.

5. The computer-implemented method of claim 2, further comprising:
defining a plurality of overlapping meshes as an overset grid for performing the CFD simulation of the aerial vehicle and the deployed parachute.

6. The computer-implemented method of claim 5, wherein the overset grid includes an aerial vehicle mesh, a parachute canopy mesh, and a parachute hole mesh overlaid on a background mesh.

7. The computer-implemented method of claim 1, wherein the CFD simulation is performed using a parallel batch system (PBS) protocol.

8. The computer-implemented method of claim 1, further comprising:
emulating failure of a propulsion system of the aerial vehicle during flight, wherein the failure of the propulsion system triggers the deployment of the internally-stored parachute.

9. A system for generating landing condition data for an aerial vehicle, the system comprising:
an aerial vehicle simulation engine operable to construct an aerial vehicle landing simulation database from input models, user-provided trajectory equations, and environmental conditions, the aerial vehicle simulation engine including:
a computational fluid dynamics solver operable to simulate flight and descent of an aerial vehicle with an internally-stored parachute;
a simulation data extraction module operable to extract simulation data from the computational fluid dynamics and user-provided trajectory equation solvers related to descent and landing via the internally-stored parachute; and
a database construction module operable to construct the aerial vehicle landing simulation database using the extracted simulation data for a plurality of input models, a plurality of environmental conditions, or a combination thereof.

10. The system of claim 9, wherein the computational fluid dynamics solver comprises:
a propulsion failure and parachute deployment module operable to emulate failure of a propulsion system of the aerial vehicle during flight and to trigger deployment of the internally-stored parachute during or after failure of the propulsion system.

11. The system of claim 10, wherein the computational fluid dynamics solver comprises:
a moving boundary condition module operable to simulate a canopy of a deployed parachute as a moving boundary condition within the computational fluid dynamics solver.

12. The system of claim 9, wherein the aerial vehicle simulation engine further comprises:
an overset grid generation module operable to construct an overset grid for the computational fluid dynamics solver, the overset grid including an aerial vehicle mesh, a parachute canopy mesh, and a parachute hole mesh overlapping on a background mesh.

13. The system of claim 9, further comprising a database appending module operable to receive further extracted simulation data from the aerial vehicle simulation engine and append the further extracted simulation data to a constructed aerial vehicle landing simulation database.

14. The system of claim 9, wherein the aerial vehicle landing simulation database constructed by the aerial vehicle simulation engine is operable to receive proposed aerial vehicle parameters, proposed parachute parameters, proposed environmental conditions, or a combination thereof to provide aerodynamic parameters to the computational fluid dynamics solver, including aerodynamic quantities for representing deployment of the internally-stored parachute and descent of the aerial vehicle.

15. A computer-implemented method for generating a simulation database of landing conditions for one or more aerial vehicles, the computer-implemented method comprising the steps of:
receiving an input model representing the one or more aerial vehicles with an internally-stored parachute;
simulating flight of the one or more aerial vehicles via computational fluid dynamics (CFD) software in a plurality of environmental conditions, the flight including a failure of a propulsion system of the one or more aerial vehicles;

simulating deployment of the internally-stored parachute and landing of the one or more aerial vehicles in the plurality of environmental conditions;

extracting simulation data for each of the one or more aerial vehicles in the plurality of environmental conditions, the simulation data including aerodynamic quantities for representing deployment of the internally-stored parachute and descent of the aerial vehicle; and constructing a database of simulation data including the one or more aerial vehicles in each environmental condition of the plurality of environmental conditions.

16. The method of claim 15, further comprising:

designing a landing system of a physical aerial vehicle utilizing the simulation database of simulation data and proposed environmental conditions with the computational fluid dynamics software.

17. The method of claim 15, further comprising:

receiving an input model representing a further aerial vehicle with an internally-stored parachute of a different design;

simulating flight of the one or more aerial vehicles via CFD software in the plurality of environmental conditions, the flight including the failure of a propulsion system of the one or more aerial vehicles;

simulating deployment of the internally-stored parachute and landing of the one or more aerial vehicles in the plurality of environmental conditions;

extracting simulation data for each of the one or more aerial vehicles in the plurality of environmental conditions; and appending the extracted simulation data to the database to increase one or more tested parameters to be included in the database of simulation data.

18. The method of claim 15, wherein the extracted simulation data is selected from the group consisting of maximum velocity during descent, time to ground after deployment, velocity at ground level, distortion of parachute canopy, acceleration of aerial vehicle during deployment, applied forces during deployment and descent, and any combination thereof.

19. The method of claim 15, further comprising:

defining a plurality of overlapping meshes as an overset grid for simulating flight of the one or more aerial vehicles and the deployed parachute.

20. The method of claim 15, wherein the deployed parachute is modeled as a moving canopy boundary condition operable to simulate oscillatory breathing of the deployed parachute during descent of the aerial vehicle.

* * * * *